United States Patent [19]
Stoll et al.

[11] Patent Number: 5,172,727
[45] Date of Patent: Dec. 22, 1992

[54] ANNULAR SEAL ARRANGEMENT AND A VALVE FITTED THEREWITH

[75] Inventors: Kurt Stoll; Manfred Rüdle, both of Esslingen, Fed. Rep. of Germany

[73] Assignee: Festo KG, Esslingen, Fed. Rep. of Germany

[21] Appl. No.: 750,962

[22] Filed: Aug. 28, 1991

[30] Foreign Application Priority Data

Aug. 31, 1990 [DE] Fed. Rep. of Germany ....... 4027520
Jul. 25, 1991 [EP] European Pat. Off. ........... 91112475

[51] Int. Cl.$^5$ ..................... F15B 13/042; F16J 15/16
[52] U.S. Cl. ........................ 137/625.66; 137/625.68; 137/625.69; 251/900; 277/165
[58] Field of Search ................. 137/625.66, 625.68, 137/625.69; 251/900; 277/165

[56] References Cited

U.S. PATENT DOCUMENTS

| | | | |
|---|---|---|---|
| 785,137 | 3/1905 | Westbrook | 137/625.66 |
| 2,191,873 | 2/1940 | Victor | |
| 2,938,704 | 5/1960 | Quail | 137/625.25 X |
| 3,275,334 | 9/1966 | Voitik | |
| 3,663,024 | 5/1972 | Traub | 277/165 |
| 3,951,166 | 4/1976 | Whitener | |
| 4,566,703 | 1/1986 | Zitting | 277/165 |

FOREIGN PATENT DOCUMENTS

| | | | |
|---|---|---|---|
| 133581 | 1/1979 | Fed. Rep. of Germany | 137/625.66 |
| 3149306 | 6/1983 | Fed. Rep. of Germany | 137/625.66 |
| 3408182 | 9/1985 | Fed. Rep. of Germany | |
| 2314411 | 1/1977 | France | |
| 55-36602 | 3/1980 | Japan | 137/625.66 |
| 600202 | 12/1977 | Switzerland | |

Primary Examiner—Gerald A. Michalsky
Attorney, Agent, or Firm—Hoffmann & Baron

[57] ABSTRACT

An annular seal arrangement for use between part placed one inside the other and able to be moved in relation to each other. The seal arrangement is constituted by a sealing ring, which has a seal housing having a substantially U-like cross section and in the form of a ring. The inner ring is elastically resilient while the outer ring functions a sealing element. The invention furthermore provides a valve fitted with such a seal arrangement, a hollow piston able to be used with it and a method for the production thereof.

25 Claims, 3 Drawing Sheets

ANNULAR SEAL ARRANGEMENT AND A VALVE FITTED THEREWITH

BACKGROUND OF THE INVENTION

The invention relates to an annular seal arrangement for producing a seal between interfitting parts and more particularly for interfitting parts which are able to be moved in relation to each other, preferably for the sealing of the valve piston of a multi-way valve in relation to the housing, comprising an elastically resilient inner ring placed in an ring-receiving recess and in front of which adjacent to the opening of the radially directed recess there is a coaxially arranged outer ring functioning as a more particularly loose sealing element. The invention furthermore is with respect to a valve fitted with such a sealing arrangement, which has a valve housing with an elongated piston receiving means, in which a plunger-like valve piston is arranged in an axially moving manner and into which on the periphery a plurality of valve ducts open.

A seal arrangement of this type has already been proposed, see for instance the Swiss patent 600,202. In this case the ring-receiving recess is a component of one of the two parts which are able to move in relation to each other and into which it is machined as a radial annular groove. This impedes assembly of the two rings, for which a substantial radial deformation is necessary. In this respect the rings may be damaged, something conducive to leaks in later use. There has admittedly already be a suggestion to make at least the outer ring with a slot as a remedy. In this case there are however leakage problems at the slot. Automated assembly of the seal arrangement is quite impossible.

A valve fitted with the seal arrangement in accordance with the said Swiss patent 600,202 is very complex to produce, is prone to cause sealing problems and is comparatively expensive.

SHORT SUMMARY OF THE PRESENT INVENTION

Accordingly one object of the invention is to provide a sealing arrangement which while being cheap in structure and leading to a reliable sealing action, furthermore renders possible automated or robotized assembly without any chance of damage to the individual rings.

A further object of the invention is to render possible a simple design of operationally reliable valves.

In order to achieve these and/or other objects appearing from the present specification, claims and figures, the present invention provides a seal arrangement of the type initially mentioned such that the ring-receiving process in a seal housing with a substantially U-like cross section is made with an annular configuration and the inner ring and the outer ring are held on the seal housing together with which they constitute a sealing ring able to be consistently handled.

In the case of a valve which comprises at least one such seal arrangement, the same is secured to a seal housing on one of the two relatively moving parts, that is to say on the valve housing or on the valve piston, in an axially fixed manner in relation thereto, the outer ring serving for sealing being able to cooperate with the respectively other moving component in a sealing manner.

The seal arrangement in accordance with the invention makes possible separate production independently from the parts to be sealed as a component which is able to be consistently handled, that is to say handled in the same way in each case, in the form of a seal ring or gasket ring, which has a seal housing in accordance with the respective requirements with separate rings arranged therein or thereon. The result is thus a structure adapted for robotized assembly and this facilitates use in automated plant. The seal ring is not limited to a certain type of valve and may in fact be used universally, in which respect in accordance with whether the recess opening is directed radially inwards or radially outward, it leads to an internally sealing ring or an externally sealing ring. The seal housing has a holding function on the one hand with respect to the two rings and on the other hand with respect to those parts, on which the seal ring is to be secured. It practically constitutes a cage, which may consist of metal and if desired, for instance in order to economize in the use of material, may have individual openings in the housing wall. The seal housing may for instance be press-fitted, by means of its housing, in the piston receiving means of a valve housing. It in such a manner that it is possible to produce low-price multi-way valves. The elastically resilient inner ring may more particularly be constituted by a low durometer synthetic resin ring, for instance one of rubber, which may take the form of a conventional O-ring. It is an advantage furthermore to use an inner ring with such a configuration of the inner cross section that owing to its design a radially resilient effect results. The outer ring preferably consists of a comparatively heard, for instance semi-hard, synthetic resin material such as Teflon or such a similar polymer so that in the case of use in valve there is hardly any friction despite the sealing action produced and sticking at the interface is out of the question. Therefore lubrication is not necessary either.

A valve fitted with one and more particularly with a plurality of the sealing rings in accordance with the invention is particularly cheap as regards assembly as well. It is sufficient to provide a piston receiving means in the valve housing in the form of a sort of cylindrical bore, which does not have to have any groove-like depressions in order to receive a seal arrangement. The seal rings in accordance with the invention only have to be inserted or fitted as far as the desired axial position. Multi-way valves of the most different types may therefore be practically produced in a modular manner by simply modifying the length of the valve housing and then fitting the necessary number of seal rings, with an axial clearance, in the circularly cylindrical piston receiving means. The press-fit between the seal housing and the part holding the seal ring therefore also has a sealing function so that in this part it is possible to dispense with additional seal elements as a further advantage. In a similar manner assembly is possible on a valve piston, as for instance a cylindrical one.

Such a valve is able to be operated in a particularly satisfactory manner in conjunction with a valve piston, which is in the form of a sleeve-like molding which is shaped without machining and on its outer periphery has at least one circumferentially extending recess. In addition to the reduction in weight which leads to shorter switching cycles and therefore a higher switching rate, it is possible to use the piston space for other purposes as well, for instance in order to accommodate a return spring or as a sort of valve duct for venting in certain positions of switching and in communication with one of the valve ducts present.

The invention will not be described in more detail with reference to the accompanying drawings, which show several working embodiments thereof.

LIST OF THE SEVERAL VIEWS OF THE FIGURES

FIG. 1 diagrammatically shows the design of a first embodiment of the valve which is fitted with a plurality of seal rings in accordance with the invention in longitudinal section, two different positions of switching of the valve and the valve piston being illustrated in parts above and below the axis of symmetry of the figure.

DETAILED ACCOUNT OF WORKING EMBODIMENTS OF THE INVENTION

Figure 1:
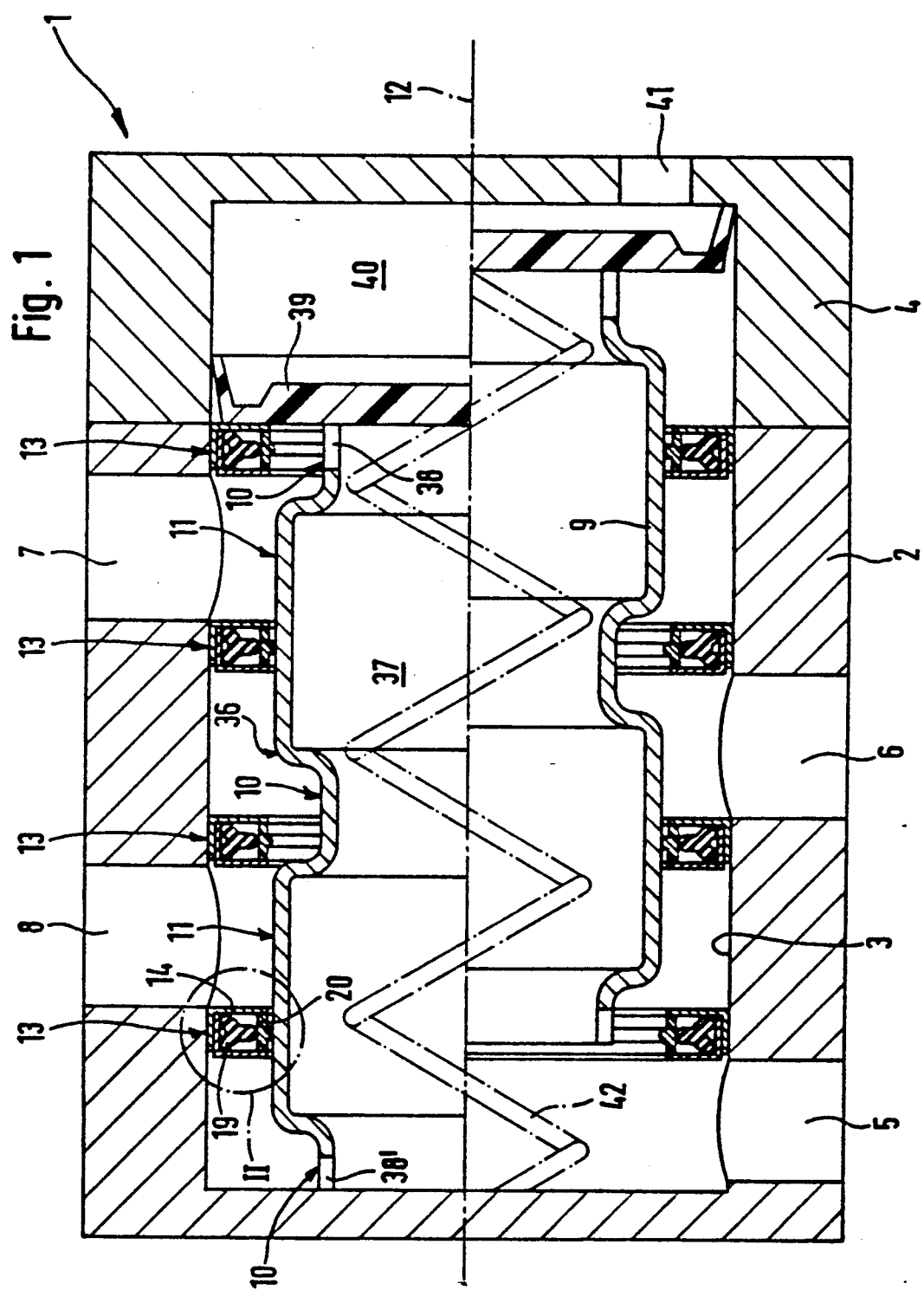

FIG. 1 shows a multi-way valve generally referenced 1, which is in the form of a 4/2 way valve and has a housing 2 with a piston receiving means 3 inside the same. The latter is in the form of a bore and in the present working has embodiment an exactly circularly cylindrical form. It is accessible from one axial end since at least one end section of the valve housing 2 is constitutes by a fixedly mounted, removable valve cover 4.

Laterally and circumferentially a plurality of valve ducts 5, 6, 7 and 8 open into the piston receiving means 3. They are able to be conventionally connected with a source (at 6) of compressed air and with loads (at 7 and 8) and a further valve duct 8 serves for venting.

A valve piston 9, which is frequently referred to as a piston spool or a valve spool, is able to be shifted axially and in the illustrated working embodiment it is able to assume two end positions illustrated in the upper and lower halves of the figure. Its outer periphery departs from a straight form in the longitudinal direction and has a plurality of circumferential recesses 10 and lands 11 or projecting parts arranged in succession in the longitudinal direction 12. This represents a conventional way of connecting different ones of the valve ducts present with each other in the different positions of the spool, while others are separated from each other.

In order to provide a seal between the valve housing 2, that is to say the wall of the piston receiving means 3 and the valve piston 9 a plurality of sealing rings 13 are secured coaxially in the piston receiving means 3 in axial succession and with a clearance between them. These sealing rings, which may be used as well in all other cases when it is a question of providing a sealing effect between coaxially nested and relatively movable parts, will be described in the following working embodiments in more detail. The use thereof is admittedly not limited to valves with parts able to be relatively moved in the axial direction 12, but however it is here that the advantages most make themselves felt so that the description will not be directed to a particularly advantageous design of the valve 1. It will be clear that the number of sealing rings 13 used by valve is to be adapted to the requirements and in certain cases it is sufficient to have a single such sealing ring 13.

Figure 2:
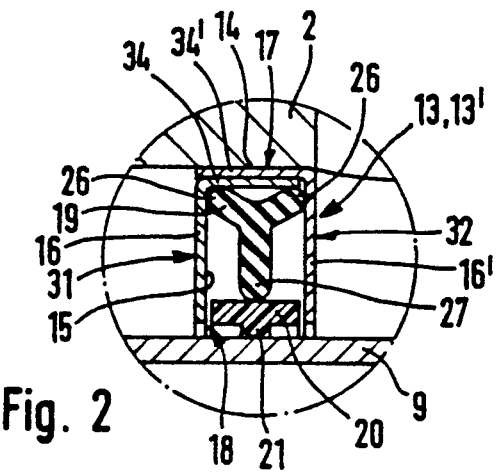
FIG. 2 shows the part II in FIG. 1 on a larger scale with a cross section taken through a seal ring, which extends in an axial and radial plane of the sealing ring.

The sealing ring 13 illustrated in figure by of example is illustrated in cross section in FIG. 2 at 13' at one point on the circumferential extent. The plane of the cross section extends at a right angle to the plane of the ring, which in the fitted condition extends perpendicularly to the longitudinal direction 12.

The sealing ring 13 and 13' has a seal housing 14, which is annular in design and in cross section has an essentially U-like configuration. Thus the seal housing 14 has an annularly extending ring-receiving recess 15, which on three sides is delimited between the ring parts 16 and 16' corresponding to the U-limbs and between the ring part 17 corresponding to the transverse part of the letter U, while at a radially directed opening 18 of the recess it is open. In the inside of the ring-receiving recess 15 there is an elastically resilient inner ring 19, which necessarily bears against the ring part 17 associated with the floor of the recess. In front of, and to the side of the recess opening 18 there is a coaxially placed outer ring 20 functioning as a seal element, which is loosely put in place, that is to say only resting in contact and not fixed connected. The two rings 19 and 20 are held by the seal housing 14 and together with the latter constitute a sealing ring 13 and 13' which is able to be consistently handled.

By means of the seal housing 14, which at one end holds the two rings 19 and 20, it is possible to secure a respective sealing ring 13 on respectively one of the relatively movable parts which are in sealing engagement with each other. In the case of a valve 1 attachment is conveniently on the housing side as is illustrated, an internally acting sealing ring 13 and 13' being used with a radially inwardly directed recess opening 13. In the fixed condition it is possible for the seal housing 14 to be axially flanked or held by a holding means on a least one of the two sides. Preferably however the same is secured by means of press-fit, as is illustrated in FIG. 1 and 2. In this case the individual sealing rings 13 and 13' are pressed with the seal housing 14 into the piston receiving means 3, the seal housing 14 being held in place with the cylindrical ring part 17, which corresponds to the cross part of the letter U and is arranged radially to the outside, on the inner surface of the piston receiving means 3.

Assembly is best performed from one axial end of the housing and in the present working embodiment firstly the valve cover 4 is removed and then the piston receiving means 3 is able to be accessed from the corresponding axial end. After this the desired number of sealing rings 13 and 13' are inserted by hand or more particularly mechanically in sequence in such a manner that in the case of a plurality of sealing rings 13, the same come to lie with an axial clearance in the piston receiving means 3. The arrangement is preferably such that a respective valve duct (5 through 8) at both axial ends is flanked by respectively one sealing ring 13, in the case of the axially outermost valve duct 5 it is possible in some cases to do without a sealing ring 13 on the axially outer end, as shown in FIG. 1. In the fixed condition the sealing rings 13 constitute axially succeeding and circumferentially extending radial projecting parts within the piston receiving means 3, axially adjacent sealing rings 13 defining a fluid space, which, dependent on the position of the valve piston 9 may be connected with, or separated from another fluid space. The respective outer ring 20 is in cooperation with that one of the two relatively moving part, which does not have the sealing ring 13 and 13' fixed on it, that is to say in the working embodiment with the valve piston 9. The outer ring 20 accordingly functions as a sealing element only, which surrounds the valve piston 9 coaxially and makes sliding contact therewith. It therefore preferably consists of semi-hard synthetic resin, for instance Teflon or another polymer, which has additional sealing properties and good anti-friction or sliding properties. As compared with rubber this material has the advantage that there is no sticking at the interface during idle times, there is only a low degree of friction and therefore wear is low and rapid switching cycles are possible with a long working life. Preferably the outer ring 20 simultaneously functions as a slip ring or guide ring, which holds the valve piston 9 centered and in position.

In order to more particularly to optimize the sealing properties, it is possible for at least one circumferentially extending rib-like radial projecting part to be provided on the outer ring 20 on the side thereof adjacent to relatively moving part and opposite to the inner ring 19. The outer ring 20 is in all illustrated working embodiments provided with just such a radial projecting part 21, which is integrally formed and in order to avoid skew running is arranged axially in the middle. It preferably causes a sharp sealing effect.

In order to render possible an adaption to the outer form or the position of the valve piston 9, that is to say to allow for manufacturing inaccuracies, it is an advantage if the outer ring 20 is able to be moved, and more particularly freely moved, in relation to the seal housing 14 in the radial direction in relation to the longitudinal direction 12. For this purpose the outer ring 20 is preferably able to be elastically deformed in the circumferential direction in relation to longitudinal axis 12 at least to a slight extent so that it may if necessary widen out somewhat. Biasing is however not absolutely necessary, since the inner ring 19 constitutes a spring ring, which conveniently bears against seal housing 14 and acts in a radial direction on the outer ring 20. The resiliently elastic properties of the inner ring 19 are due for instance to its design configuration and/or more particularly the selection of its material. In the case of the working embodiments it consists of a material with rubber-elastic properties and is preferably in the form of a rubber ring. In order to not unnecessarily restrict mobility and in order to be able to adapt the materials of the two rings 20 and 21 independently of each other to the respective requirements, the two rings 19 and 20 are preferably constituted by individual rings and rest against each other in the radial direction without any permanent connection between them.

The inner ring 19 preferably also constitutes a seal element which provides a sealing action between the outer ring 20 and the seal housing 14 so that the outer ring 20 is not contacted by the flowing liquid on the side facing the interior of the seal housing 14.

The inner ring 19 illustrated on a larger scale in FIG. 2 exerts an elastic resilient effect on the outer ring 20 owing to its design configuration as well. As seen in cross section in accordance with FIG. 2 it generally ha the form of a letter Y, whose top end, that is to say its ring section 26 connecting the two Y limbs, is facing the floor of the recess. From the inside they bear radially against ring part 17 and they may simultaneously also act axially from the inside on the lateral ring parts 16 and 16'. The lower end of the letter Y, that is to say the ring section 27 constituting the base of the letter Y, is turned towards the outer ring 20 and its free end acts on the facing radial side thereof, more particularly axially in the center and in this respect preferably in the same radial plane as the radial projecting part 21.

Each of the three ring sections 26 and 27 has in this case preferably a sealing action, which may be further enhanced if fluid under pressure is able to move axially to the side of the outer ring 20 out of the piston receiving means 3 into the ring-receiving recess 15 and is able to exert a sealing thrust on the inner ring 19. This pressure may possible and additionally exert a pressing thrust on the outer ring 20.

Figure 3:
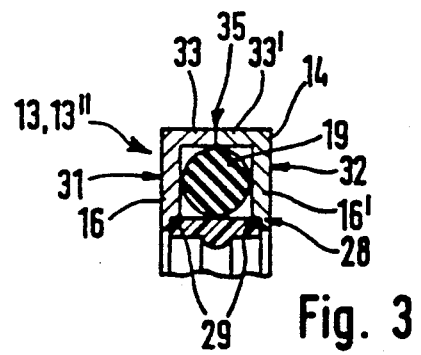
FIG. 3 shows a further embodiment of a sealing ring with a showing similar to that of FIG. 2.
Figure 4:
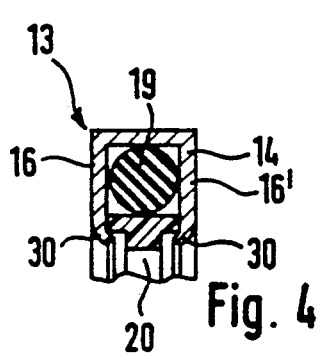
FIG. 4 shows a working embodiment of the sealing ring with an advantageous possibility for retaining the outer ring, also in a showing similar to that of FIG. 2.
Figure 7:
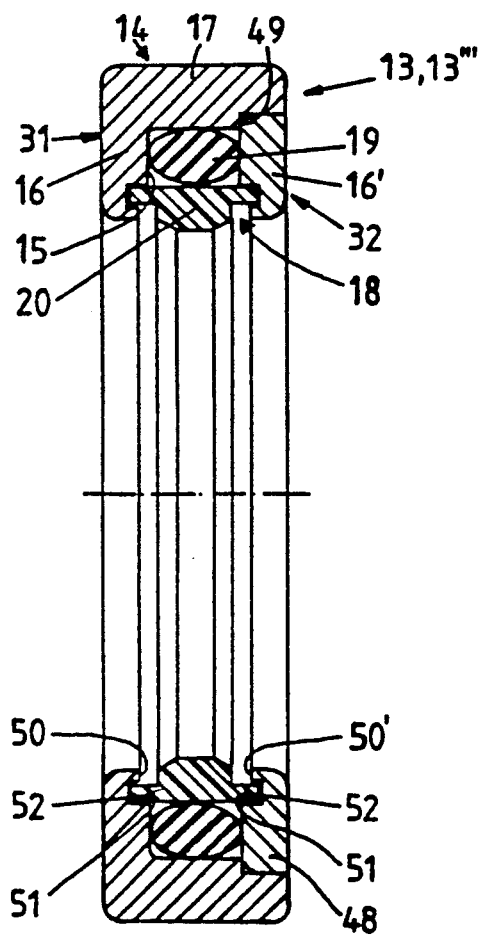
FIG. 7 shows a further working embodiment of a sealing ring in cross section in manner resembling FIGS. 2 through 4.

In the illustrated working embodiments illustrated in FIGS. 3, 4 and 7 in the case of which it is furthermore a question of corresponding components with like reference numerals, the inner ring 19 is constituted by a conventional O-ring of, for instance, rubber material, which at least in the fitted condition may also have an elliptical cross section (see FIG. 7). Preferably the outer ring 20 is permanently connected with the seal housing. This is ensured for instance as shown in FIGS. 2 and 3 by its being at least partly sunk into the ring-receiving recess 15 so that its axial edge parts are at least partly flanked by the two ring parts 16 and 16'. Simply owing to its ring or annular form the outer ring 20 is prevented from dropping out. In the illustrated working embodiment of FIG. 3 there is the further provision that on the side, which is facing the inner ring 19, of the outer ring 20 on the seal housing 14 a radial movement abutment 28 is then provided for the outer ring 20. It is constituted by respectively one circumferentially extending shoulder 29 of the radially directed part of the ring parts 16 and 16' flanking the recess opening 18. It is in such a manner that the outer ring 20 is particularly well steadied in position.

A particularly reliable way of holding the outer ring 20 is possible if, as in the working embodiment of FIGS. 4 and 7, it is encircled or partly encircled on its side remote from the inner ring 19 by edge parts of the seal housing 14. This is for instance the design in FIG. 4, in which the ring parts 16 and 16' are bent round or crimped at their respective radially directed edge towards the outer ring 20. It is in such a manner that the outer ring 20 has its two axial edge parts between the bent around holding parts 30 and the inner ring and the result is a preferably an elastic clamping and holding action. The holding parts 30 may extend over the entire periphery of the ring and it is possible however to have separate edge sections spaced out in the circumferential direction of the ring and which are bent over.

It will be clear that the individual modifications of the design illustrated in the different working embodiments of the sealing rings are not tied to the respective type of sealing ring and may be exchanged with other rings.

While in the working embodiment in accordance with FIG. 4 the seal housing 14 is made in one piece so that the two rings 19 and 20 are snapped into place for fitting or the housing is bent around the correspondingly arranged rings 19 and 20 during manufacture, the seal housing 14 of the other working embodiments is advantageously made of a plurality of parts and is preferably made in two parts. With reference now to FIGS. 2, 3 and 7 it will be seen that the sealing rings 13 consist of two permanently connected coaxially arranged ring parts 31 and 32 in such a manner that in the unconnected condition, that is to say when the ring parts 31 and 32 are separate from each other prior to fitting there is an axially arranged annular insertion opening for the inner and outer rings 19 and 20. Therefore firstly the two ring parts 31 and 32 will be separately manufactured and the prior to assembly the two rings 19 and 20 will be placed in one of the ring parts 31 and 32, whereafter while simultaneously closing the opening the second ring part will be attached. This offers the advantage that the rings 19 and 20 doe not have to be upset or expanded during assembly so that they may be mechanically inserted without danger of damage very simply and the entire sealing ring may be fitted with the aid of a robot.

It is more particularly advantageous if the two ring parts 31 and 32 have an L cross section as shown in FIGS. 2 and 3 and are so connected with each other that as seen in cross section the U-like form of housing is produced. In the case of the sealing ring 13 and 13" in FIG. 3 the two ring parts 31 and 32 are so arranged axially in sequence that two L limbs are directed towards each other and the two other L-limbs are radially directed. The two L-limbs turned towards each other are preferably arranged so that the associated circumferentially extending ring parts 33 and 33' abut with each other bluntly and in the abutment part are permanently connected together. In the illustrated working embodiment there is a bond, but a welding connection would be possible for instance as well.

The sealing ring 13 and 13' in accordance with FIG. 2 has an even stronger seal housing 14, because the two ring parts 31 and 32 are so arranged that the parts 34 and 34', which correspond to the axially directed L-limbs, overlap axially. The ring part 17 of the sealing ring 13 and 13' is in this case constituted by the overlapping parts 34 and 34' of the two ring parts 31 and 32, which are L-like in cross section. In this case also the two ring part 31 and 32 may be secured by a joint connection permanently. However it is an advantage if the two ring parts 31 and 32 are pressed into each other so that adjacent to the overlapping parts 34 and 34' there is a press-fit which is normally permanent.

In the illustrated working embodiment of FIG. 2 each ring part 31 and 32 therefore consists of a flat ring disk corresponding to the ring part 16 and 16', at whose outer each the generally cylindrically part 34 and 34' is coaxially adjacent, the outer diameter of the one ring part 34 being so matched to the inner diameter of the other ring part 34' that the two ring parts may be plugged onto each other with overlap with the free edge part of the cylindrical ring parts 34 and 34' held in front.

The sealing ring in accordance with the invention may be used for the manufacture of valves with different lengths and fluid paths therethrough with particular advantage. As an example it is possible for a tube part corresponding to the eventual valve housing to be cut to the desired length and then for the desired number of sealing rings to be inserted. In this case it is convenient to shut off the piston receiving means 3 at both ends with separate covers. It is a particular advantage in conjunction with a valve 1 containing the sealing ring 13 in accordance with the invention to use a valve piston 9, which is constituted by a single-piece hollow sleeve molding shaped without machining, which on the outer periphery has a circumferential recess 10. Such a valve piston 9 is illustrated in FIG. 1. Owing to the absence of machining, i.e. of cutting operations, it is possible to produce particularly exactly planar outer surfaces of the projecting parts 11, which during switching of the valve 1 slide along the outer rings 20, this also applying for the annular transitional parts 36 as far as the recesses 10. The transitional parts 36 preferably have a fillet or are radiused so that an outer ring 20 will not be damaged if during movement of the piston out of a position which does initially contact valve piston 9 and arranged adjacent to a recess 10, it passes a transitional zone 36 and comes into sealing contact with the outer surface of projecting part 10.

The hollow valve piston 9, produced without machining, is extremely light in weight and consists for instance of thin-walled aluminum or stainless steel and owing to the small mass to be accelerated and cheap production, renders possible a high switching rate. Although such a valve piston 9 is able to be employed in practically every type of valve, there are however particular advantages in conjunction with a valve 1 having the sealing ring 13 in accordance with the invention, since cheap construction is generally possible. The sealing ring 13 themselves are practically made in the form of a cartridge since the outer ring 20 functioning as sealing ring rests loosely on the spring ring in the seal housing 14 or the cage.

The piston cavity 37 in the inside of the valve piston 9 may furthermore be utilized as a means ancillary to the valve function. In the working embodiment the piston cavity 37 is utilized as a flow duct for the valve fluid, for instance for venting. In the left switching position illustrated in FIG. 1 at the top, of the valve piston 9 the valve duct 7 leading to a load, is connected via an opening 38 in the wall of the piston with the piston cavity 37, which via a further opening 38' at the opposite end of the piston is connected with the venting valve duct 5. In the right end position illustrated in the bottom part the connection by the valve duct 7 and the piston cavity 27 is interrupted and in place of it the valve piston 9 allows a connection between the valve duct 8, which also leads to a load, and the venting valve duct 5. It will be clear that given a suitable design it is possible to omit the openings 38 and 38' if the valve fluid is able to enter and leave the piston cavity 37 directly at the end. In the illustrated working embodiment the opening 38 associated with the valve duct 7 is necessary, because the valve piston 9 is closed at the right end by an actuating piston 39, which runs in a working space 40 which axially adjoins the piston receiving means 3, such working space 40 being connected with a drive duct 41 in a known manner.

The piston cavity 37 is also suitable for receiving a valve piston return spring 42 shown in broken lines in FIG. 1 and which is used if the actuating piston 39 is only single acting.

Figure 5:
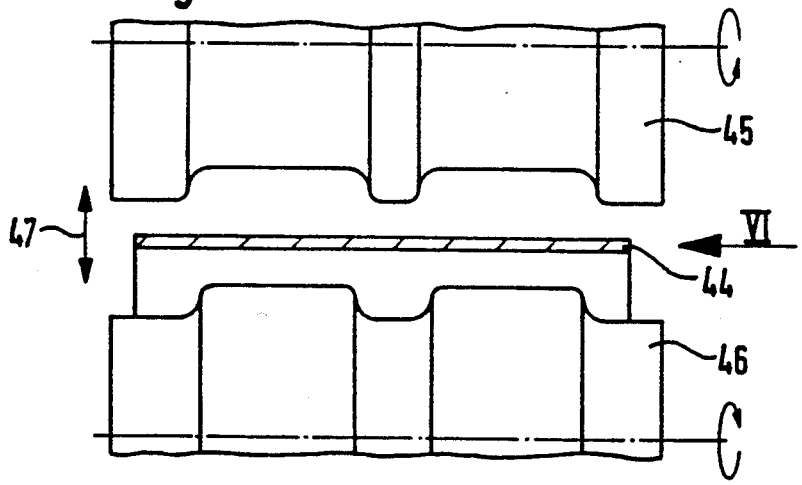
FIG. 5 shows diagrammatically a device for the production of the piston used in the valve in accordance with FIG. 1 as based on a particularly advantageous piston producing method.

For the production of the hollow valve piston 9 it is preferred to firstly, for example, cut off or otherwise prepare a length from a cylindrical and more particularly circularly cylindrical tube with a thin wall. After this tube 44 as illustrated in FIG. 5 is inserted by cold deformation and without machining into the recesses 10, as is indicated in FIG. 1. It is convenient in this respect to use to rolls 45 and 46 which are diagrammatically indicated at the periphery of the tube or, respectively, hollow member 44 so as to in engagement therewith externally and internally.

Figure 6:
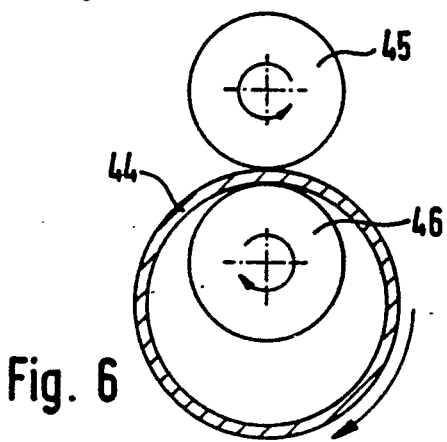
FIG. 6 is an end-on view looking in the direction of the arrow VI of the device illustrated in FIG. 5.

As shown in FIGS. 5 and 6 the hollow part 44 for processing is slipped over the inner roll 46 whose outer diameter at least approximately corresponds to the desired inner diameter of the piston, whereafter the outer roll 45 is applied to the outer periphery, which is coaxial and corresponds to the desired outer form of the piston. Rotary driving takes place in such a manner that the two rolls 45 and 46 are turned in the opposite directions, for which purpose at least one of the two rolls is preferably driven. During rotation the two rolls 45 and 46 are moved towards each other in the radial direction as indicated by the double arrow 47, the hollow part 44 rotating in the same direction as the inner roll 46 and being formed inwardly and outwardly. As shown in FIGS. 5 and 6 the entire shaping of the piston molding is achieved in a single working operation since at least one of the two rolls 45 and 46 corresponds to the desired overall diameter of the piston. Furthermore it is possible as well naturally for the recesses 10 and, respectively, the projecting parts 11 to be produced by the use of single rolls. Thus it is possible to fix if desired the hollow part 44 on a chuck so that the outer roll 45 may be used to form it by spinning.

It is generally an advantage if initially the desired shaping operation is preceded by a preforming operation using recessing rolls to roughly achieve the desired configuration, whereafter precision finishing operation is carried out with smoothing rolls, which more particularly produce the desired high quality surface adjacent to the projecting parts 11 and in the transitional part 36. The method might be termed "rollerized spinning".

The so-called cartridge valve as illustrated is free of dynamic soft parts, that is to say the parts making sliding contact are comparatively hard and do not require lubrication. Simple and trouble-free assembly using robots is possible and the sealing rings may be inserted into the piston receiving means readily without recesses or the like. The result is a modular design with which for instance 5/2, 5/3 or 4/2 way valves may be manufactured. Owing to the semi-hard properties of the outer ring 20 there is a satisfactory sealing performance with little friction. There is less leakage that with a combination of "hard and soft". The line contact produced by having a radial projecting part 21 offers the advantage with respect to a seal with a large contact area that even after prolonged idle periods sticking at the interfaces and damage to the seal is prevented. The valve housing is preferably manufactured without machining from aluminum or a hard polymer. Furthermore the seal housing preferably consists of a comparatively hard material such as metal or a hard synthetic resin. The use of a hollow piston makes possible, owing to the chance of using its cavity as a duct, a short overall length in the axially direction. The sealing ring is reliable even under very high pressures of for instance up to 16 bar and may also possibly be use for hydraulic systems. The preferred field of use is however pneumatic ones.

In the illustrated working embodiment of FIG. 7 the sealing ring 13 and 13''' again has a first ring part with an L-like cross section, while on the other hand the second ring part 32 is formed by a ring disk 48. In the assembled condition the ring disk 48 constitutes the ring part 16' corresponding to the one U-limb, while the first ring part 32 constitute the two other ring parts. It is preferred for the ring disk 48 to be radially within the cylindrical ring part 17 on the free end section thereof, which is axially opposite to the first ring part 16. It is for instance pressed in place, the depth of pressing being present if desired by a radial projecting part, more particularly a circumferential one, of the center ring part 17.

It would also be possible to have a three-part seal housing, in the case of which each of the ring parts 16, 16' and 17 would be separate.

The ring disk 48 may also be provided with a radially narrower disk part so that it would only form a part of the ring part 16'.

To hold the outer ring 20 the two lateral ring parts 16 and 16' have, on the axially adjacent inner surface 50 and 50', a respective circumferentially extending coaxial groove, into which the two axial end or edge parts 52 of the outer ring 20 fit. The radially measured groove breadth if preferably somewhat larger than the thickness of the edge parts 52 so that there is a flexible attachment.

In the illustrated working embodiment in FIG. 7 it is possible for the inner ring 19 to have an oval or elliptical cross section in order to reduce the radial dimensions, the principal geometrical axis extending axially. This configuration may also be produced in the case of an O-ring which is initially circular in cross section, when it is acted upon by the outer ring.

Furthermore the remarks made on the seals in accordance with FIGS. 1 through 4 also apply for the sealing ring in accordance with FIG. 7 correspondingly.

We claim:

1. An annular seal arrangement for providing a seal between a valve housing and an axially-directable spool-like piston positioned in said valve housing comprising:
    an annular seal housing having a pair of axially-spaced lateral walls and an intermediate wall, said intermediate wall extending between said axially-spaced lateral walls so that said seal housing defines a generally U-like ring-receiving recess, said seal housing being formed from at least two ring parts so that said recess may be accessed when said housing is unassembled, at least one of said ring parts having a dish-like shape such that it forms at least a portion of one of said lateral walls, said ring parts being press-fit into one another to form said seal housing;
    an annular elastically-resilient inner ring positioned in said ring-receiving recess adjacent to said intermediate wall;
    an annular outer seal ring positioned in said ring-receiving recess and situated radially inwards from said inner ring; and
    means for retaining said rings in said seal housing to form an integral unit being capable of being handled without external holding means.

2. The seal arrangement according to claim 1, wherein said inner ring is biased against said intermediate wall such that said inner ring applies a uniform radially-inward force to said outer ring for forcing said outer ring into sealing contact with said piston.

3. The seal arrangement according to claim 1, wherein said inner ring is a rubber ring.

4. The seal arrangement according to claim 1, wherein said outer seal ring is a synthetic resin ring.

5. The seal arrangement according to claim 4, wherein said synthetic resin ring is one of a wear resistant polymer material and a semi-hard synthetic resin.

6. The seal arrangement according to claim 1, wherein said outer seal ring is permanently connected to said seal housing.

7. The seal arrangement according to claim 6, wherein said axially-spaced lateral walls of said seal housing have flange portions at the ends thereof for encircling and retaining said outer seal ring within said ring-receiving recess.

8. The seal arrangement according to claim 6, wherein the sides of said axially-spaced lateral walls facing said ring-receiving recess include a circumferentially-extending groove in which the axial edge parts of said outer seal ring are retained.

9. The seal arrangement according to claim 1, wherein said outer seal ring may be radially moved with respect to said seal housing.

10. The seal arrangement according to claim 1, wherein the sides of said axially-spaced lateral walls facing said ring-receiving recess include a circumferentially-extending shoulder, said circumferentially-extending shoulder providing a radial movement abutment.

11. The seal arrangement according to claim 1, wherein said outer seal ring includes at least one centrally-fixed circumferentially-extending rib-like radial projecting part, said radial projecting part positioned on the side of said outer seal ring opposite said inner ring.

12. A valve comprising:
a valve housing having an elongated piston receiving means therein, said valve housing also having at least two valve ducts in fluid communication with said piston receiving means;
a spool-like piston positioned in said piston receiving means and arranged for axially-directed movement; and
at least one annular seal arrangement press-fit in said piston receiving means for providing a seal between said valve housing and said piston, said seal arrangement comprising:
an annular seal housing having a pair of axially-spaced lateral walls and an intermediate wall, said intermediate wall extending between said axially-spaced walls so that said seal housing defines a generally U-like ring-receiving recess, said seal housing being formed from at least two ring parts so that said recess may be accessed when said housing is unassembled, at least one of said ring parts having a dish-like shape such that it forms at least a portion of one of said lateral walls, said ring parts being press-fit into one another to form said seal housing;
an annular elastically-resilient inner ring positioned in said ring-receiving recess adjacent to said intermediate wall;
an annular outer seal ring positioned in said ring-receiving recess and situated radially inwards from said inner ring; and
means for retaining said seal rings in said seal housing to form an integral unit being capable of being handled without external holding means.

13. The valve according to claim 12, wherein said piston receiving means has a substantially cylindrical configuration and is accessible from one axial side for press-fitting said seal arrangements therein.

14. The vale according to claim 12, wherein said piston is a single piece, hollow sleeve-like molding having at least one circumferentially-extending recess on the outer surface.

15. The valve according to claim 14, wherein said hollow interior of said piston defines a flow duct for valve fluid.

16. The valve according to claim 14, wherein a return spring is positioned in said hollow interior of said piston.

17. The valve according to claim 12, wherein said inner ring is a rubber ring.

18. The valve according to claim 12, wherein said outer seal ring is a synthetic resin ring.

19. The valve according to claim 18, wherein said synthetic resin ring is one of a wear resistant polymer material and a semi-hard synthetic resin.

20. The valve according to claim 12, wherein said outer seal ring is permanently connected to said seal housing.

21. The valve according to claim 20, wherein said axially-spaced lateral walls of said seal housing have flange portions at the ends thereof for encircling and retaining said outer seal ring within said ring-receiving recess.

22. The valve according to claim 20, wherein the sides of said axially-spaced lateral walls facing said ring receiving recess include a circumferentially-extending groove in which the axial edge parts of said outer seal ring are retained.

23. The valve according to claim 12, wherein said outer seal ring may be radially moved with respect to said seal housing.

24. The valve according to claim 12, wherein the sides of said axially-spaced lateral walls facing said ring-receiving recess include a circumferentially-extending shoulder, said circumferentially-extending shoulder providing a radial movement abutment.

25. The valve according to claim 12, wherein said outer seal ring includes at least one centrally-fixed circumferentially-extending rib-like radial projecting part, said radial projecting part positioned on the side of said outer seal ring opposite said inner ring.

* * * * *

UNITED STATES PATENT AND TRADEMARK OFFICE
CERTIFICATE OF CORRECTION

PATENT NO. : 5,172,727
DATED : 12/22/92
INVENTOR(S) : Kurt Stoll

It is certified that error appears in the above-identified patent and that said Letters Patent is hereby corrected as shown below:

Column 1, Line 53, "process" should be --recess--;

Column 2, Line 11, "outward" should be --outwards--;

Column 2, Line 30, "heard" should be --hard--;

Column 3, Line 40, "constitutes" should be --constituted--;

Column 4, Line 7, "used by" should be --used per--;

Column 6, Line 18, "possible" should be --possibly--;

Column 7, Line 50, "cylindrically" should be --cylindrical--; and

Column 7, Line 56, after "front." please insert --This method of assembling is more particularly able to be robotized.--.

Signed and Sealed this

Twenty-first Day of December, 1993

Attest:

BRUCE LEHMAN

Attesting Officer     Commissioner of Patents and Trademarks